(12) United States Patent
Zamarreño et al.

(10) Patent No.: US 9,600,341 B2
(45) Date of Patent: Mar. 21, 2017

(54) TRANSACTION STICKY LOAD BALANCE POLICIES

(75) Inventors: Galder Zamarreño, Neuchatel (CH); Brian Edward Stansberry, Ballwin, MO (US)

(73) Assignee: Red Hat, Inc., Raleigh, NC (US)

( * ) Notice: Subject to any disclaimer, the term of this patent is extended or adjusted under 35 U.S.C. 154(b) by 980 days.

(21) Appl. No.: 12/558,714

(22) Filed: Sep. 14, 2009

(65) Prior Publication Data

US 2011/0066672 A1    Mar. 17, 2011

(51) Int. Cl.
G06F 15/16     (2006.01)
G06F 9/50      (2006.01)
G06F 9/46      (2006.01)
G06F 9/54      (2006.01)

(52) U.S. Cl.
CPC .............. G06F 9/505 (2013.01); G06F 9/466 (2013.01); G06F 9/548 (2013.01)

(58) Field of Classification Search
CPC ........... G06F 9/466; G06F 9/505; G06F 9/548
USPC ........................................ 709/203, 217, 227
See application file for complete search history.

(56) References Cited

U.S. PATENT DOCUMENTS

| | | | |
|---|---|---|---|
| 7,562,147 B1* | 7/2009 | Cohen ..................... | H04L 67/02 709/228 |
| 7,584,262 B1* | 9/2009 | Wang .................. | H04L 12/4625 709/217 |
| 7,882,501 B1* | 2/2011 | Carlson ..................... | G06F 8/67 709/203 |
| 2003/0065711 A1* | 4/2003 | Acharya ........... | H04L 29/12009 709/203 |
| 2004/0004116 A1* | 1/2004 | Hatanaka ............... | G06Q 40/02 235/379 |
| 2004/0019670 A1* | 1/2004 | Viswanath .......... | H04L 41/0253 709/223 |
| 2004/0148185 A1* | 7/2004 | Sadiq ................... | G06Q 30/016 705/304 |
| 2005/0135235 A1* | 6/2005 | Maruyama ................ | H04L 1/22 370/219 |
| 2006/0167891 A1* | 7/2006 | Blaisdell ............. | G06F 11/3495 |
| 2006/0167975 A1* | 7/2006 | Chan ................... | H04L 67/2819 709/203 |
| 2007/0189312 A1* | 8/2007 | Acharya ........... | H04L 29/12009 370/401 |
| 2007/0283023 A1* | 12/2007 | Ly .......................... | H04L 69/16 709/227 |

(Continued)

*Primary Examiner* — David Lazaro
*Assistant Examiner* — Vitali Korobov
(74) *Attorney, Agent, or Firm* — Lowenstein Sandler LLP (57) ABSTRACT

A transaction sticky load balance policy allows a remote client to choose a target server node from a server cluster to provide a transaction service. The load balance policy directs invocations of business methods within a transaction to the same target server node. The remote client receives the load balance policy from a proxy, which is downloaded to the remote client from one of the server nodes in the server cluster. The remote client selects a target server node according to the load balance policy. The remote client then invokes the business methods within a transaction on the target server node via the proxy. The target server node can execute all of the business methods within the transaction on a Java virtual machine. The business methods can be implemented with Enterprise JavaBeans (EJBs).

20 Claims, 5 Drawing Sheets

(56) References Cited

U.S. PATENT DOCUMENTS

| | | | | |
|---|---|---|---|---|
| 2010/0128598 A1* | 5/2010 | Gandhewar | ......... | H04L 67/2814 370/217 |
| 2010/0174939 A1* | 7/2010 | Vexler | ................. | G06F 17/3048 714/5.1 |
| 2010/0268829 A1* | 10/2010 | Ly | ........................... | H04L 69/16 709/227 |
| 2010/0333111 A1* | 12/2010 | Kothamasu | ......... | H04L 12/5855 719/313 |

\* cited by examiner

TRANSACTION STICKY LOAD BALANCE POLICIES

TECHNICAL FIELD

Embodiments of the present invention relate to computer programming and, more specifically, to installation of the implementation of a Java-based application server.

BACKGROUND

An application server is a software framework that delivers applications to client computers or devices. An application server facilitates software development by allowing designers and programmers to devote their time to meeting software requirements rather than dealing with the standard low-level details of providing a working system. An application server can be provided as middleware that sits between operating systems and high-level enterprise applications. An application server enables applications to intercommunicate with dependent applications, such as transaction servers, database management systems, and web servers.

An application server can host Enterprise JavaBeans (EJBs), which can be invoked by remote clients to run business methods. For example, an application server that provides banking service can host multiple EJBs, with each EJB providing a banking-related method, such as balance inquiry, cash withdrawal, deposit, etc. A single transaction can sometimes involve the invocation of one or more EJBs. For example, a balance transfer between a savings account and a checking account can be implemented with withdrawal (a first EJB) from the savings account followed by deposit (a second EJB) into the checking account. The use of EJBs simplifies application developments. With the use of EJBs, application developers can focus on the development of high-level service features, without the need to understand the low-level details about transactions and state management.

Currently, when a remote client calls remote methods on EJBs deployed on a server cluster within a transaction, a number of problems can occur. For example, suppose an EJB is deployed in a 3-node cluster with a conventional round-robin load balance policy. If the client makes three invocations to a method on this EJB within a transaction, each of the invocations will be executed by a different server node and a different transaction will be created in each server node. If the client tries to rollback the transaction, only one transaction on one of the server nodes will be rolled back.

Further, for a transaction to be successful, a number of properties need to be fulfilled. These properties include: Atomicity, Consistency, Isolation, and Durability (ACID). Atomicity refers to a property that all changes made by a transaction to a database should be made as one unit; otherwise, all changes are rolled back. Consistency refers to a property that a successful transaction transforms a database from a previous valid state to a new valid state. Isolation refers to a property that changes made by a transaction to a database are not visible to other operations until the transaction is completed. Durability refers to a property that changes made by a transaction to a database survive future system or media failures. With the existing load balance policies, there is no guarantee that a UserTransaction.begin( ) operation and any of the EJB invocations within that user transaction will be executed by the same server node. If a user transaction and the EJB invocations within that user transaction are not executed by the same server node, the ACID properties of the transaction will not be fulfilled.

Moreover, problems can arise when a remote client starts a transaction that makes remote calls on different EJBs deployed on different server nodes, and one of the nodes fails. For example, two EJBs (EJB A and EJB B) are deployed on both node 1 and node 2. A remote client starts a transaction and calls EJB A, which lands on node 1. Still within the same transaction, the remote client attempts to call EJB B and the load balance policy picks node 2. However, the call on EJB B fails. An attempt to failover to node 1 will not succeed, because transactions started in node 1 and node 2 are independent and node 2 has no knowledge of the transaction started in node 1. As a result, the failed call would not be allowed to go to a different node.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system that supports a transaction sticky load balance policy. In one embodiment, each server node in a server cluster is configured with a load balance policy, which allows a remote client to choose a target server node from the server cluster to provide a transaction service. The load balance policy directs invocations of business methods within a transaction to the same target server node. The remote client receives the load balance policy from a proxy, which is downloaded to the remote client from one of the server nodes in the server cluster. The remote client selects a target server node according to the load balance policy. The remote client then invokes the business methods within a transaction on the target server node via the proxy. The target server node may execute all of the business methods within the transaction on a Java virtual machine. In one embodiment, the business methods are implemented with Enterprise JavaBeans™ (EJBs).

According to the embodiments of the present invention, the term "transaction" refers to an indivisible unit of work. A transaction can include multiple operations. To protect data integrity, either all of the operations complete (referred to as "commit"), or none of the operations can complete at all (referred to as "rollback"). For example, a financial transaction for transferring funds from a checking account to a savings account may include three operations (debit checking account, credit savings account and update history log). If all of the three operations successfully complete, data modifications made by the three operations are saved. If any of the three operations within the transaction fails, the transaction rolls back, undoing the data modifications made by all of the operations in the transaction. For example, if a disk drive crashes during the credit step, the transaction will roll back and undo the data modifications made by the debit statement. Thus, a transaction can ends with either commit or rollback, and the ACID properties are fulfilled.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "downloading", "executing", "determining", "invoking", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
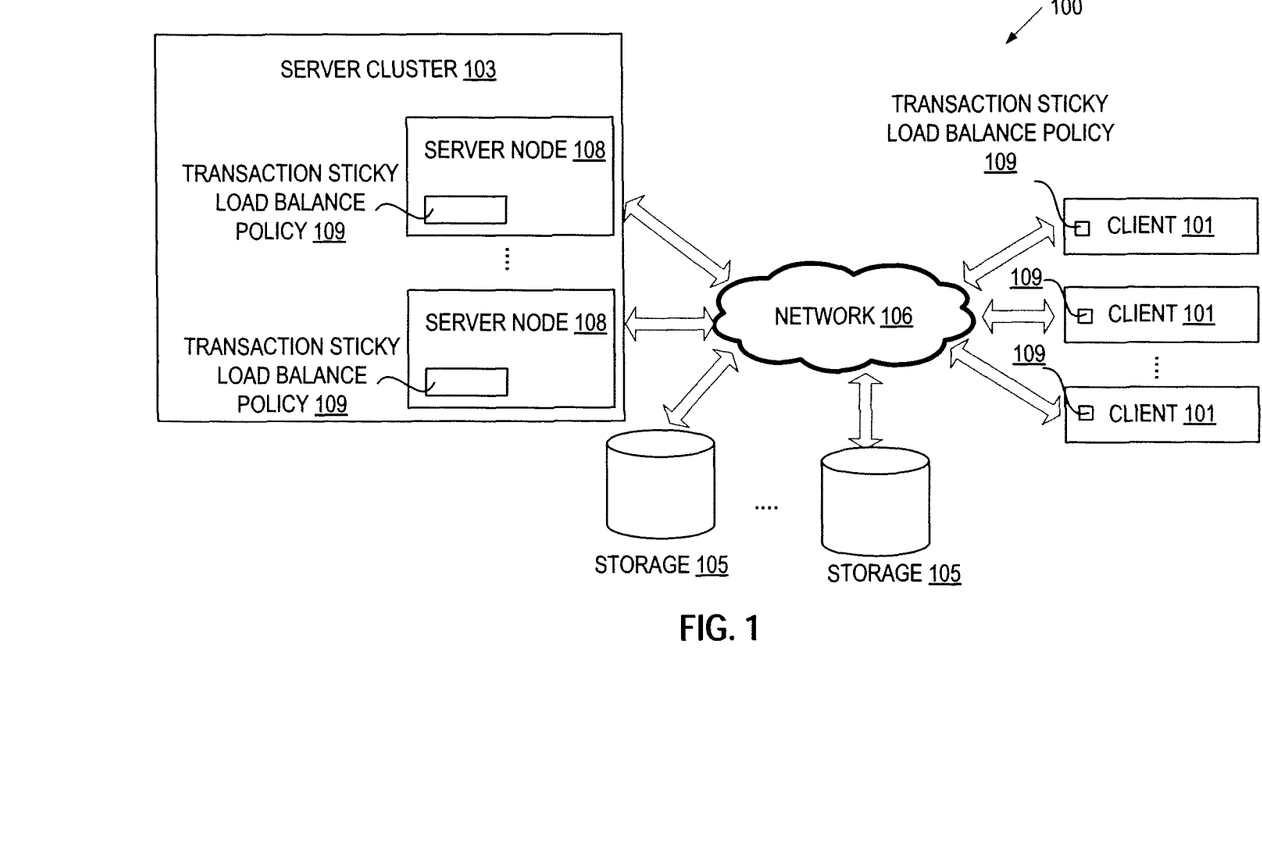
FIG. 1 is a block diagram of an exemplary architecture in which embodiments of the invention may be implemented.

FIG. 1 illustrates an exemplary network architecture 100 in which embodiments of the present invention may operate. The network architecture 100 may include client devices (clients) 101, a network 106 and a plurality of server nodes 108 in a server cluster 103. The clients 101 may be general-purpose, special-purpose or multi-function computing/communication devices, for example, server machines, workstations, personal computers (PCs), portable computing devices, mobile phones, personal digital assistants (PDAs), etc. The network 106 may be a private network (e.g., a local area network (LAN), wide area network (WAN), intranet, etc.) or a public network (e.g., the Internet).

In one embodiment, each server node 108 in the server cluster 103 is a computer that provides Java-based transaction services to the clients 101. Examples of transaction services include banking service, reservation service, or other business transaction services. Transactions provided by the transaction services may be distributed transactions, in which data is accessed on two or more networked resources. A specification for distributed transaction is defined in Java Transaction API (JTA). The transaction services can be accessed by the clients 101 via the network 106.

The server cluster 103 may be coupled to data storage 105 locally or remotely via the network 106. The data storage 105 may be centrally located, or distributed over multiple geographic locations. The data storage 105 may include memory, caches, data drives, internal or external storages, mass storage, etc. In one embodiment, the data storage 105 may store one or more data repositories or databases that contain data for providing the transaction services. For example, the data storage 105 may store financial information of bank customers for providing a banking service to the customers.

The server cluster 103 allows a transaction service to run on multiple server nodes 108 concurrently. The load incurred by clients 101 can be distributed across multiple server nodes 108. Thus, if any one of the server nodes 108 fails, the transaction service can still be accessible via other server nodes 108.

In one embodiment, the distribution of load is balanced according a transaction sticky load balance policy 109. Each of the server nodes 108 that provide a transaction service has a copy of the transaction sticky load balance policy 109 elected by a user (e.g., a system administrator). Each of the clients 101 that receive the transaction service also has a copy of the transaction sticky load balance policy 109. The transaction sticky load balance policy 109 directs the client 101 to select a target server node 108 for performing a transaction. The transaction sticky load balance policy 109 dictates the client 101 to direct all calls (also referred to as "invocations") to business methods (e.g., EJBs) within a transaction to the same server node 108 in the server cluster 103. Invocations associated with different transactions can be load-balanced among different server nodes 108. The client 101 can elect a different server node 108 when a new transaction starts. However, within a transaction, all of the business method calls are directed to a single server node 108.

Figure 2:
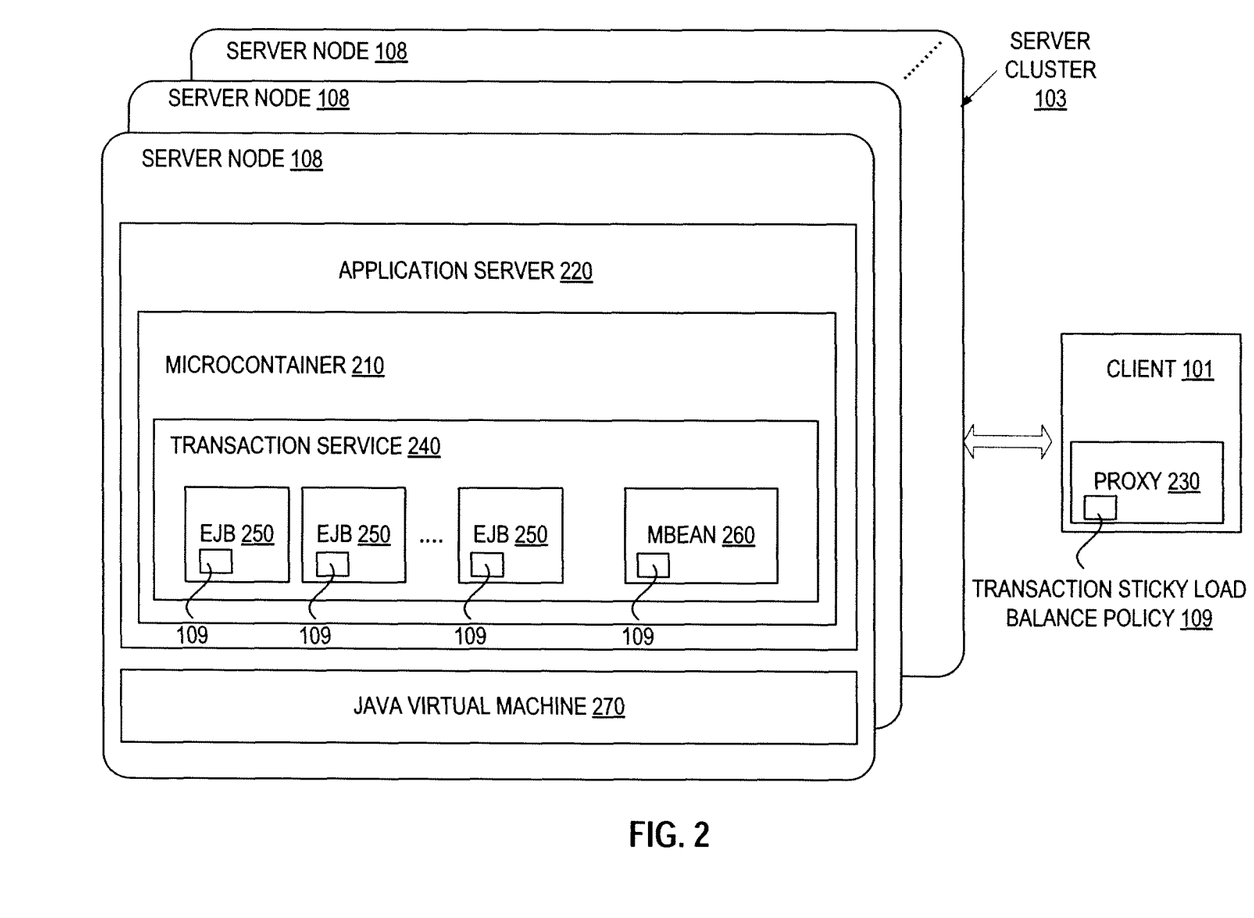
FIG. 2 is a block diagram illustrating one embodiment of an application server that runs on each server node in a server cluster.

FIG. 2 illustrates an embodiment of a server cluster 103 including a number of server nodes 108, with each server node 108 running an application server 220. The application server 220 includes a microcontainer (MC) 210 to support a transaction service 240 that is accessible by a remote client (e.g., the client 101). The term "container" refers to a software construct (e.g., class) that holds or organizes software objects (e.g., Java objects). A container also includes methods for adding and removing objects, as well as methods for iterating the addition and removal of the objects.

An embodiment of the transaction service 240 includes a number of business methods implemented by EJBs 250 and a management component Management Bean (MBean) 260. The EJBs 250 and the MBean 260 are deployed in the MC 210 through a sequence of deployment stages. Through specific interfaces (e.g., a home interface and a component interface) provided on each EJB 250, a remote client can invoke the EJB 250 to have the EJB 250 executed by a Java Virtual Machine (JVM) 270. Each of the EJBs 250 and MBean 260 is configured with an elected transaction sticky load balance policy 109.

In one embodiment, the client 101 invokes each EJB 250 via a client-side proxy 230 downloaded from one of the server nodes 108. The proxy 230 implements the business interface of the transaction service 240, and performs load balance according to the elected transaction sticky load balance policy 109. Each server node 108 uses the EJBs 250 and the MBean 260 of the transaction service 240 to generate the proxy 230. As the EJBs 250 and the MBean 260 are configured with the transaction sticky load balance policy 109, the proxy 230 generated from these beans is also configured with the same transaction sticky load balance policy 109. The client 101 can then download the proxy 230 from a designated server node 108 via Java Naming and Directory Interface (JNDI), or from a random server node 108 discovered with multicast communications. Once the proxy 230 is downloaded, the client 101 calls the business methods (e.g., by invoking the EJBs 250) via the proxy 230. The proxy 230 determines a target server node 108 for each transaction according to the transaction sticky load balance policy 109, routes calls to the target server node, and returns the results to the client 101.

In one embodiment, the transaction sticky load balance policy 109 may be one of the policies that include: a transaction sticky round robin, a transaction sticky first available, a transaction sticky first available all proxies, and a transaction sticky random robin. These policies share the common feature of "transaction stickiness," which means all invocations of business methods (e.g., EJBs) within a transaction are directed to the same server node 108. The differences among the policies lie in how a target server node 108 is chosen from one transaction to the next transaction.

"Round robin" means that server nodes 108 are chosen in a circular order for each transaction. "First available" means that one of the available server nodes 108 is elected as the target for each transaction. With "first available," the proxy 230 on each client 101 elects its own target independent of other proxies. "First available all proxies" means that an elected first available server node 108 is shared by all client-side proxies of the same family as the target server node 108. Using EJBs as an example, all proxies invoking the same EJBs belong to the same proxy family. "Random robin" means that the target server node 108 is elected randomly.

Figure 3:
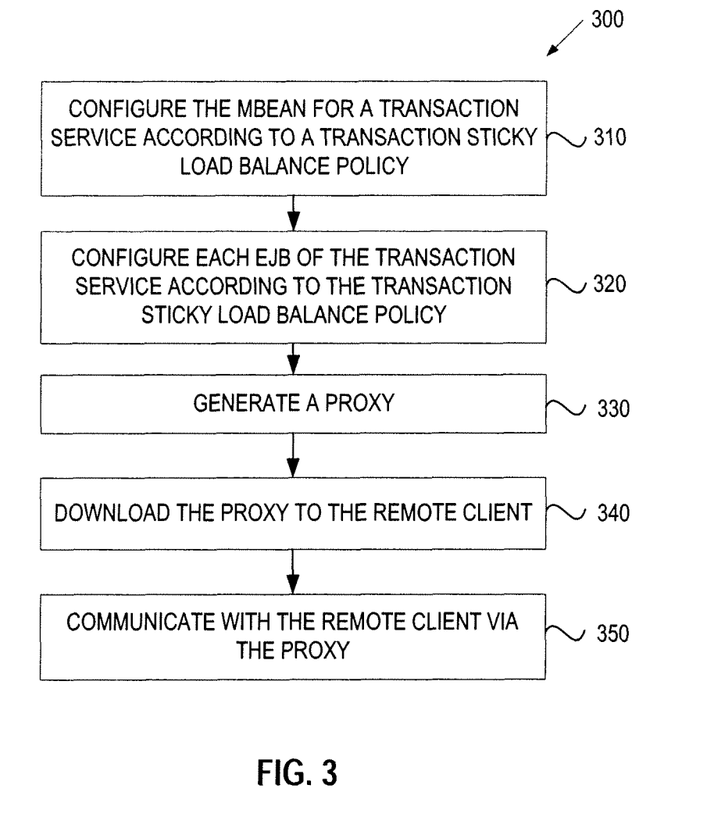
FIG. 3 is a flow diagram illustrating a method of a server node that supports transaction sticky load balance policies, in accordance with one embodiment of the present invention.

FIG. 3 is a flow diagram illustrating an example of a method 300 for the application server 220 to provide a transaction service to the remote client 101 according to a transaction sticky load balance policy that has been elected by a user (e.g., a system administrator). The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by one or more of the server nodes 108 in the server cluster 103.

Referring to the embodiment of FIG. 3, the method 300 begins when the server node 108 receives a first configuration file (e.g., an Extensible Markup Language (XML) file) for the MBean 260, which is deployed into the MC 210 to manage the transaction service 240 (block 310). The first configuration file specifies the load balance policy (e.g., transaction sticky round robin) to be used for selecting a target server node in the server cluster 103. Subsequently, the server node 108 receives a second configuration file (e.g., an XML file) that configures each of the EJBs 250 providing the business methods of the transaction service 240 (block 320). The second configuration file specifies the same load balance policy (e.g., transaction sticky round robin) as in the first configuration file. Each EJB 250 is configured according to the scope of the transactions provided by the transaction service 240. For example, if the remote client 101 is to call the EJB home and business methods within a transaction, both of the EJB's home interface and component interface need to be configured with the elected load balance policy. If the remote client 101 only calls the EJB business methods within the transaction, only the component interface needs to be configured with the elected load balance policy. Based on the first and second configuration files, the server node 108 generates the proxy 230 configured with the elected transaction sticky load balance policy (block 330), and then downloads the proxy 230 to the remote client 101 (block 340). The server node 108 then communicates with the remote client 101 via the downloaded proxy 230 to provide the transaction service 240 to the remote client 101 (block 350).

Figure 4:
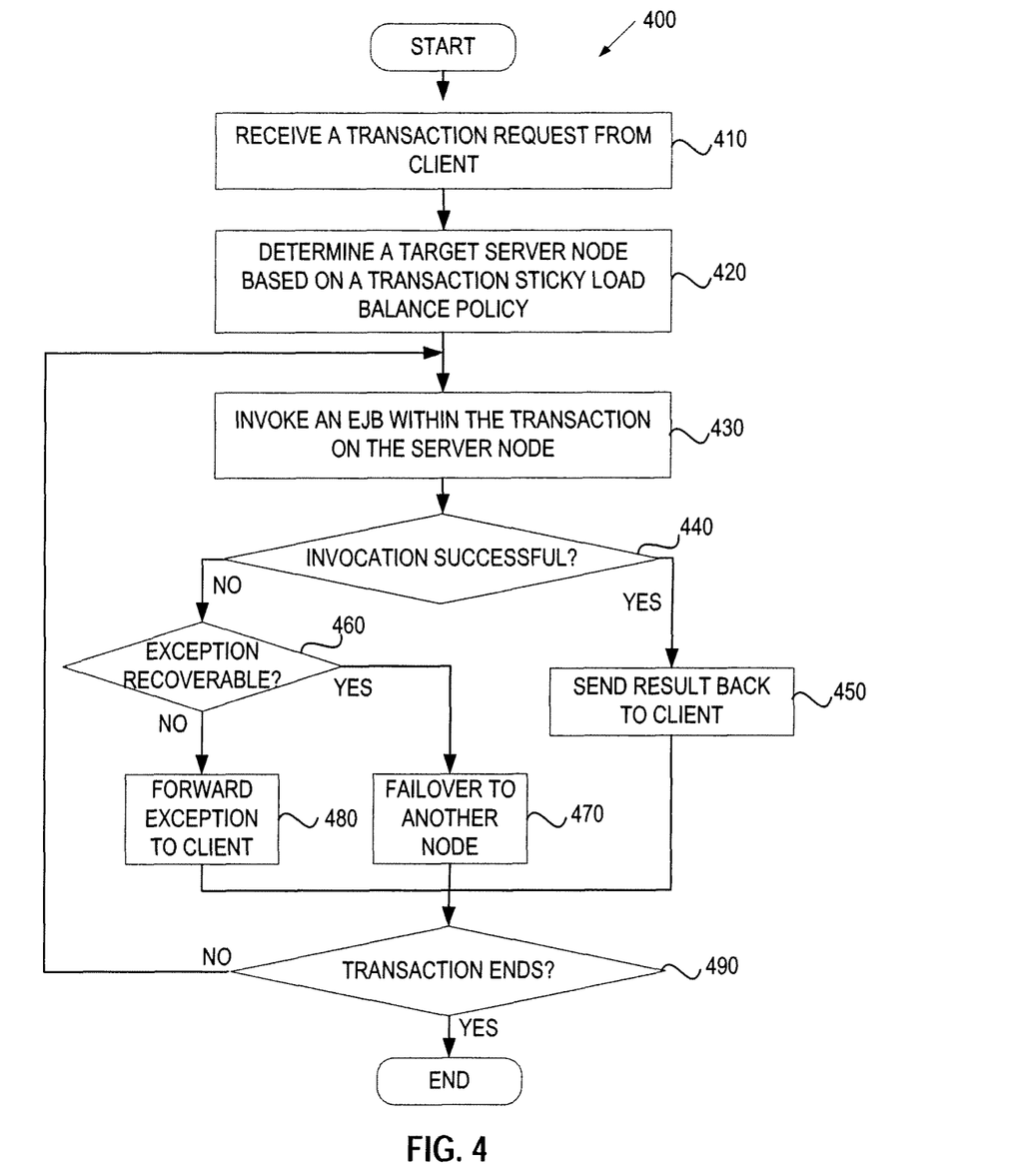
FIG. 4 is a flow diagram illustrating a method of a client machine that supports transaction sticky load balance policies, in accordance with one embodiment of the present invention.

FIG. 4 is a flow diagram illustrating an example of a method 400 for a remote client 101 to receive the transaction service 240 from the server cluster 103 according to transaction sticky load balance policies. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the proxy 230, after the proxy 230 is downloaded to the client 101. As mentioned above in connection with FIG. 2, the proxy 230 downloaded to the client 101 is configured with the elected transaction sticky load balance policy.

Referring to the embodiment of FIG. 4, the method 400 begins when the proxy 230 receives a transaction request from the client 101 (block 410). The proxy 230 determines a target server node 108 based on the elected transaction sticky load balance policy (block 420). On behalf of the client 101, the proxy 230 invokes one of the EJBs 250 deployed on the target server node 108 (block 430). If the invocation succeeds (e.g., there are no system-level exceptions) (block 440), the proxy receives the result of the invocation and sends the result back to the client 101 (block 450). If the invocation fails (block 440), the proxy 230 determines whether the exception is recoverable (block 460). For example, the exception is recoverable if the target server node 108 becomes unreachable. If it is a recoverable exception, the proxy 230 re-elects ("fails-over to") a new target server node 108 to send the invocation (block 470), and to receive result from the re-elected target node. If the exception is not recoverable, the proxy 230 forwards the exception to the client 101 (block 480) and lets the client 101 decide how to proceed with the transaction, or to rollback the transaction.

The proxy 230 may receive more than one EJB invocation with a transaction. If the transaction is not over (block 490), the proxy 230 may invoke the same or another EJB on behalf of the client 101 (block 430). The EJB is invoked on the same target server node 108 as in the previous invocation within the same transaction. The operations of blocks 440-480 repeat until the transaction is over. In the next transaction, the proxy 230 can elect a different target server node 108 according to the elected load balance policy.

Figure 5:
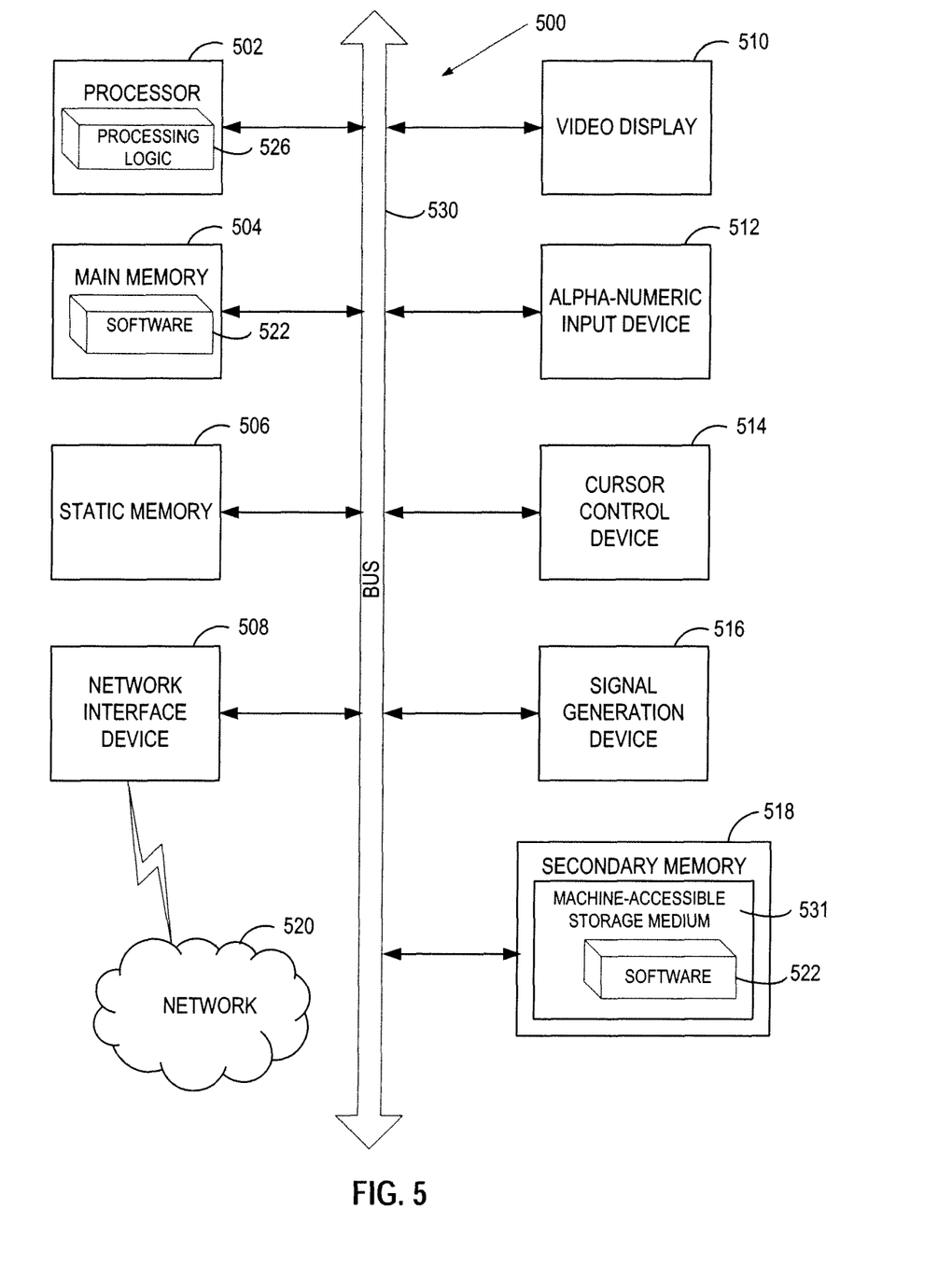
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may store the proxy 230, the EJBs 250, the MBean 260 and the transaction load balance policy 109 (FIGS. 1 and 2). While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
executing, by a processing device of an application server, a transaction service, the application server being one of a plurality of application servers in an application server cluster, the plurality of application servers in the application server cluster executing the transaction service concurrently;

identifying, by the processing device, a policy for selecting one of the plurality of application servers in the application server cluster as a single application server for a transaction comprising a plurality of transaction-related operations, wherein the policy directs all of a plurality of invocations corresponding to the plurality of transaction-related operations of the transaction to the single application server to protect data integrity of the transaction;

receiving component configuration information indicating one or more components of the transaction service to be configured with the policy;

generating, by the processing device, a proxy in view of the policy and the component configuration information; and providing, by the processing device, the proxy to a remote client, the proxy containing the policy directing the proxy to send all of the plurality of invocations of the plurality of transaction-related operations of the transaction to the single application server.

2. The method of claim 1, further comprising:
executing all of the plurality of transaction-related operations within the transaction on a Java virtual machine on the single application server.

3. The method of claim 1, wherein the plurality of transaction-related operations are implemented with Enterprise JavaBeans™ (EJBs).

4. The method of claim 1, wherein the policy comprises a configuration of a Management Bean (MBean) that manages the transaction service and the component configuration information comprises a configuration of EJBs that implement the plurality of transaction-related operations comprising the transaction service.

5. The method of claim 1, wherein the policy directs invocations of all of the plurality of transaction-related operations within a next transaction to a different application server in the application server cluster than the single application server.

6. The method of claim 1, wherein the policy comprises one of the following: transaction sticky round robin, transaction sticky first available, transaction sticky first available all proxies, or transaction sticky random robin.

7. A method comprising:
receiving, by a processing device of a remote client, a request to perform a plurality of transaction-related operations of a transaction, wherein the plurality of transaction-related operations correspond to a plurality of invocations to invoke the plurality of transaction-related operations, and are undoable in response to failure of one of the plurality of transaction-related operations;

selecting, by the processing device, in view of a policy stored on the remote client, a single application server from a plurality of application servers in an application server cluster according to the policy, wherein the plurality of application servers in the application server cluster execute a transaction service concurrently to perform the plurality of transaction-related operations, and wherein the policy directs all of the plurality of invocations of the plurality of transaction-related operations of the transaction to the single application server;

directing, by the processing device, a first invocation of the plurality of invocations of the plurality of transaction-related operations within the transaction to the single application server to cause a corresponding first transaction-related operation of the plurality of the transaction-related operations within the transaction to be executed by a Java virtual machine on the single application server;

identifying a second transaction-related operation of the plurality of the transaction-related operations to be performed for the transaction;

determining, by the processing device, from the policy to direct a second invocation of the plurality of invocations to the single application server to cause the second transaction-related operation to be executed by the single application server to protect data integrity of the transaction; and directing the second invocation of the plurality of invocations to the single application server.

8. The method of claim 7, wherein the plurality of transaction-related operations are implemented with Enterprise JavaBeans™ (EJBs).

9. The method of claim 7, wherein the load balance policy directs invocations of all of the plurality of transaction-related operations within a next transaction to a different application server in the application server cluster than the single application server.

10. The method of claim 7, further comprising:
determining the single application server for each transaction using the proxy.

11. The method of claim 7, further comprising:
determining whether an invocation of each transaction-related operation is successful; and
in response to a determination that the invocation is unsuccessful, selecting a different application server in the application server cluster to re-send the invocation.

12. A system comprising:
memory; and
a processing device of an application server being one of a plurality of application servers in an application server cluster, the processing device, operatively coupled to the memory, to:
execute a transaction service, the plurality of application servers the application server cluster to execute the transaction service concurrently; and
identify a policy for selecting one of the plurality of application servers in the application server cluster as a sing application server for a transaction comprising a plurality of transaction-related operations, wherein the policy directs all of a plurality of invocations corresponding to the plurality of transaction-related operations of the transaction to the single application server to protect data integrity of the transaction;
receive component configuration information indicating one or more components of the transaction service to be configured with the policy;
generate a proxy in view of the policy and the component configuration information; and
provide the proxy to a remote client, the proxy containing the policy directing the proxy to send all of the plurality of invocations of the plurality of transaction-related operations of the transaction to the single application server.

13. The system of claim 12, wherein the plurality of transaction-related operations are implemented with Enterprise JavaBeans™ (EJBs), and wherein the memory is to store data to be accessed by a Java-based transaction service.

14. The system of claim 12, wherein the proxy determines a different application server than the single application server in the application server cluster for the remote client when a new transaction starts.

15. The system of claim 12, wherein the proxy re-sends an invocation of a transaction-related operation to a different application server than the single application server in the application server cluster in response to a determination that a prior invocation was unsuccessful.

16. The system of claim 12, wherein policy comprises a configuration of a Management Bean (MBean) that manages the transaction service and the component configuration information comprises configuration of EJBs that implement the transaction-related operations comprising the transaction service.

17. A non-transitory computer readable storage medium including instructions that, when executed by a processing device of an application server being one of a plurality of application servers in an application server cluster, cause the processing device to:
   execute, by the processing device, a transaction service, the plurality of application servers in the application server cluster to execute the transaction service concurrently;
   identify, by the processing device, a policy for selecting one of the plurality of application servers in the application server cluster as a single application server for a transaction comprising a plurality of transaction-related operations, wherein the policy directs all of a plurality of invocations corresponding to the plurality of transaction-related operations of the transaction to the single application server to protect data integrity of the transaction;
   receive component configuration information indicating one or more components of the transaction service to be configured with the policy;
   generate, by the processing device, a proxy in view of the policy and the component configuration information; and
   provide the proxy to a remote client, the proxy containing the policy directing the proxy to send all of the plurality of invocations of the plurality of transaction-related operations of the transaction to the single application server.

18. The non-transitory computer readable storage medium of claim 17, wherein the operations, when executed by the processing device, further cause the processing device to:
   execute all of the transaction-related operations within the transaction on a Java virtual machine on the target server node.

19. The non-transitory computer readable storage medium of claim 17, wherein the plurality of transaction-related operations are implemented with Enterprise JavaBeans™ (EJBs).

20. The non-transitory computer readable storage medium of claim 17, wherein the policy comprises a configuration of a Management Bean (MBean) that manages the transaction service and the component configuration information comprises a configuration of EJBs that implement the transaction-related operations comprising the transaction service.

* * * * *